Patented Sept. 16, 1947

2,427,601

UNITED STATES PATENT OFFICE 2,427,601

PRODUCTION OF ORGANIC NITRILES

Charles R. Harris, Lockport, N. Y., assignor to E. I. du Pont de Nemours & Company, Wilmington, Del., a corporation of Delaware No Drawing. Application March 30, 1945, Serial No. 585,809

7 Claims. (Cl. 260—464)

This invention relates to the production of organic nitriles, and more particularly, it relates to a new and improved method for the production of acrylonitrile or succinonitrile, or both acrylonitrile and succinonitrile, from hydrogen cyanide and ethylene oxide.

Prior to the present invention numerous methods were proposed for the production of acrylonitrile and succinonitrile. At the present time, in recently developed plants for the production of acrylonitrile, the latter is produced by reacting hydrogen cyanide with ethylene oxide in the liquid phase in the presence of an alkaline catalyst to produce ethylene cyanhydrin, and the ethylene cyanhydrin is dehydrated by catalytic vapor phase dehydration to produce the acrylonitrile. (Chemical Industries, June 1944, page 835.) In producing acrylonitrile by this process, great care must be exercised in reacting the hydrogen cyanide with the ethylene oxide in order to avoid polymerization of the hydrogen cyanide by the alkaline catalyst. This method is also subject to certain hazards since it is highly exothermic and in the liquid system employed, may easily get out of control. Ethylene cyanhydrin may also be obtained by reaction of a metal cyanide with ethylene chlorhydrin. In producing ethylene cyanhydrin from ethylene chlorhydrin, the recovery and purification of the cyanhydrin is complicated, involving salt separation, solvent extraction and vacuum distillation.

It has also been proposed, heretofore, to prepare acrylonitrile by passing a mixture of acetylene and hydrogen cyanide vapor over a heated catalyst. This method is disclosed in German Patent No. 559,743. This process is subject to very low yields which are of the order of about 10%. In the process disclosed in U. S. Patent No. 2,324,854, acrylonitrile is prepared by passing a mixture of acetylene and hydrogen cyanide vapor into an aqueous solution of cuprous and ammonium chlorides. This method is objectionable due to the hazard involved as a result of the production of the highly explosive divinyl acetylene as a by-product in the reaction, and also due to the possibility of forming explosive copper acetylide. The product of this reaction is, furthermore, difficult to purify due to the nature of the by-products formed.

Succinonitrile has, heretofore, been prepared by reacting metal cyanides with ethylene dihalides. This method is expensive and inconvenient to carry out.

It is an object of the present invention to provide a new and improved method for the production of acrylonitrile.

It is a further object of this invention to provide a new and improved method for the production of succinonitrile.

It is still another object of this invention to provide a method for the production of acrylonitrile from hydrogen cyanide and ethylene oxide by a single reaction.

Still another object of this invention is to provide a method for manufacturing both acrylonitrile and succinonitrile by the direct reaction between hydrogen cyanide and ethylene oxide.

Other objects of the invention will appear hereinafter.

The objects of this invention may be accomplished, in general, by reacting ethylene oxide with hydrogen cyanide in the vapor phase in the presence of a catalyst. This may be accomplished by passing the mixed vapors of hydrogen cyanide and ethylene oxide over a heated catalyst. The proportions of ethylene oxide and hydrogen cyanide vapors can be so adjusted that both acrylonitrile and succinonitrile are simultaneously formed, or they can be so adjusted as to form substantially only acrylonitrile.

Preferably, the reaction is carried out by first vaporizing ethylene oxide and hydrogen cyanide, mixing the vapors in the desired proportions and passing the mixed vapors over a catalyst heated to within the range of 150° C. to 650° C. The reaction may, however, be carried out by passing liquid ethylene oxide and liquid hydrogen cyanide in the proper proportions into a heating zone to vaporize the reactants simultaneously after contacting the catalyst, or before contact with the catalyst. This method is less desirable, however, since in view of the exothermic character of the reaction, it may be more easily controlled by mixing the vapors before they are brought into contact with the catalyst. Furthermore, by employing mixed vapors, it is possible to add inert gases in such amounts as to control the temperature of the reaction.

As catalysts for use in carrying out the process of this invention, compounds of metals selected from the III, IV, V, VI, and VIII groups of the periodic table, and preferably a catalyst of the commonly known class of dehydration catalysts may be used. The oxides of aluminum, thorium, silicon, vanadium, molybdenum, titanium, tungsten and nickel or a metal of the platinum group of metals may be used to good advantage. The above mentioned oxides are preferably employed in the form of hard, porous, monocrystalline gels.

Other dehydrating catalysts are composed of salts such as alums, basic aluminum salts, metal phosphates and the like. The preferred catalyst for use in carrying out the reaction of the present invention is highly purified silica gel, such as may be prepared by neutralizing sodium silicate, or by the hydrolysis of silicon halides or esters of orthosilicic acid.

Although the reaction may be carried out at any temperature between 150° C. and 650° C., it is preferred to carry out the operation with the temperature at the hottest point in the catalyst mass between 200° C. and 400° C. Where it is desired to produce succinonitrile as a product of the reaction, it is particularly important to carry out the reaction at a temperature below 500° C.

The hydrogen cyanide and ethylene oxide reactants may be employed in any desired proportion. It is preferred, however, that not more than four molecular proportions of one reactant be present for each molecular proportion of the other reactant. When it is desirable to produce acrylonitrile as the main product of the reaction, it is preferred that an excess of ethylene oxide over the equimolecular proportion be present in the gas mixture. When it is desired to produce a large proportion of succinonitrile, it is preferred to have present in the gaseous mixture, at least 2 molecular proportions of hydrogen cyanide for each molecular proportion of ethylene oxide. Inert diluent gases such as nitrogen, hydrogen, or carbon monoxide, may be incorporated in the feed gas mixture, as a means for adjusting the temperature of the reaction, if so desired.

In place of hydrogen cyanide, any substance which will produce HCN under the conditions of the reaction may be used. For example, in the presence of heat and a dehydration catalyst, formamide will be split almost quantitatively into HCN and water; formamide can therefore be used in place of HCN. Throughout the specification and claims, reference to HCN as a reactant is intended to include the formation of HCN under the conditions of the reaction.

The following examples are given to illustrate, in detail, the process of the present invention, it being understood, however, that the invention is not to be limited to the details of the examples.

Example I

A vertically mounted 24 mm. I. D. silica reaction tube was charged with 100 cc. of 4–10 mesh alumina gel which had been previously dried in a stream of air at 400° C. The temperature was raised to 250° C. A gaseous feed mixture of one molecular proportion of HCN and 2½ molecular proportions of ethylene oxide was passed over the catalyst at a rate of 900 cc. per minute. The mixture in traversing the catalyst bed reacted to form acrylonitrile and water. The reaction was highly exothermic and nitrogen was added to the feed gas mixture in such amounts as required to keep the temperature of the catalyst within the range of 260–280° C. at the hottest point. The vapor mixture issuing from the catalyst bed was passed through a condenser cooled with ice-water and the condensate collected in a receiver. The condensate collected over a 30 minute operating period separated into two sharply defined layers of about 10 cc. each; an aqueous layer and an organic layer. The organic layer was separated, dried and purified by distillation. The major portion distilled between 75 and 80° C. and consisted of almost pure acrylonitrile.

Example II

This experiment was carried out in the same manner as Example I except that the catalyst consisted of 100 cc. of 4–10 mesh silica gel, and the feed gas consisted of 1 molecular proportion of ethylene oxide for each 2 molecular proportions of HCN. The gas mixture was passed over the catalyst at a rate of approximately 650 cc. per minute. The temperature at the hottest point in the catalyst was kept in the range of 350–400° C. and nitrogen was added to the feed gas, as needed, to keep the temperature from going too high.

The crude liquid product collected during a 22 minute operating period weighed 16 g. In this experiment the liquid product was homogeneous and did not separate into liquid layers. Distillation yielded two main organic fractions. The first distilled at 65–80° C. at atmospheric pressure and consisted of acrylonitrile containing some water. The second distilled at 110–125° C. at a pressure below 10 mm. of mercury. This latter fraction weighed 4.5 g. It crystallized in the receiver and consisted of almost pure succinonitrile. It was identified by its melting point (50–52° C.) and by converting it to succinic acid.

It will be seen from the foregoing that this invention offers a means of preparing acrylonitrile in a single step from HCN and ethylene oxide. The method is an outstanding improvement in that it involves fewer operations, requires less equipment, and avoids hazards and other drawbacks of previous method. Acrylonitrile and succinonitrile are easily obtained in a high state of purity from the crude product of our invention by fractional distillation. The catalysts employed have a long life and when fouled can readily be regenerated by burning out organic deposits with air or oxygen containing gases.

Since it is obvious that many changes and modifications can be made in the above described details without departing from the nature and spirit of the invention, it is to be understood that the invention is not to be limited to said details except as set forth in the appended claims.

I claim:

1. A process for the production of an organic nitrile taken from the group consisting of acrylonitrile and succinonitrile which comprises passing a gaseous mixture of HCN and ethylene oxide over a dehydration catalyst taken from the group consisting of the oxides of aluminum, thorium, silicon, vanadium, molybdenum, titanium, tungsten, and nickel, said catalyst having a temperature at its hottest part of between 200° C. and 500° C.

2. A process for the production of an organic nitrile taken from the group consisting of acrylonitrile and succinonitrile which comprises passing a gaseous mixture of HCN and ethylene oxide over silica gel having a temperature at its hottest part between 200° C. and 500° C.

3. A process for the production of an organic nitrile taken from the group consisting of acrylonitrile and succinonitrile which comprises passing a gaseous mixture of HCN and ethylene oxide in a proportion not to exceed 4 moles of one reactant to 1 mole of the other reactant over a dehydration catalyst taken from the group consisting of the oxides of aluminum, thorium, silicon, vanadium, molybdenum, titanium, tungsten, and nickel, said catalyst having a temperature at its hottest part between 200° C. and 500° C.

4. A process for the production of acrylonitrile which comprises passing a gaseous mixture of HCN and ethylene oxide with the latter in greater than equimolecular proportion over a dehydration catalyst taken from the group consisting of the oxides of aluminum, thorium, silicon, vanadium, molybdenum, titanium, tungsten, and nickel, said catalyst having a temperature at its hottest part between 200° C. and 500° C.

5. A process for the production of succinonitrile which comprises passing a gaseous mixture of HCN and ethylene oxide in the proportion of at least two moles of HCN for each mole of ethylene oxide over a dehydration catalyst taken from the group consisting of the oxides of aluminum, thorium, silicon, vanadium, molybdenum, titanium, tungsten, and nickel, said catalyst having a temperature at its hottest part of between 200° C. and 500° C.

6. A process for the production of an organic nitrile taken from the group consisting of acrylonitrile and succinonitrile which comprises vaporizing HCN and ethylene oxide, mixing said vapors in a proportion not to exceed 4 moles of one to 1 mole of the other, and passing the gaseous mixture over a dehydration catalyst taken from the group consisting of the oxides of aluminum, thorium, silicon, vanadium, molybdenum, titanium, tungsten, and nickel, said catalyst having a temperature at its hottest part between 200° C. and 500° C.

7. A process for the production of an organic nitrile taken from the group consisting of acrylonitrile and succinonitrile which comprises vaporizing HCN and ethylene oxide, mixing said vapors in a proportion not to exceed 4 moles of one to 1 mole of the other, passing the gaseous mixture over a dehydration catalyst taken from the group consisting of the oxides of aluminum, thorium, silicon, vanadium, molybdenum, titanium, tungsten, and nickel, said catalyst having a temperature at its hottest part between 200° C. and 500° C. and adding an inert gas to said gaseous mixture to control the temperature of the reaction.

CHARLES R. HARRIS.

REFERENCES CITED

The following references are of record in the file of this patent:

UNITED STATES PATENTS

| Number | Name | Date |
|---|---|---|
| 2,364,422 | Brooks | Dec. 5, 1944 |
| 1,914,326 | Fick | June 13, 1933 |
| 2,374,051 | Spence | Apr. 17, 1945 |
| 2,374,052 | Spence et al. | Apr. 17, 1945 |
| 2,390,519 | Davis et al. | Dec. 11, 1945 |

FOREIGN PATENTS

| Number | Country | Date |
|---|---|---|
| 496,372 | Germany | Apr. 24, 1930 |

OTHER REFERENCES

Erlenmeyer, Liebigs Annalen, vol. 191, pp. 269-280 (1878).